US 9,751,491 B2
(12) United States Patent
Sugimura et al.

(10) Patent No.: US 9,751,491 B2
(45) Date of Patent: Sep. 5, 2017

(54) SIDE AIRBAG DEVICE

(71) Applicants: MAZDA MOTOR CORPORATION, Aki-gun (JP); ASHIMORI INDUSTRY CO., LTD., Osaka-shi (JP)

(72) Inventors: Yuichi Sugimura, Aki-gun (JP); Taei Shibahara, Aki-gun (JP); Shinji Okada, Aki-gun (JP); Masato Hoshino, Aki-gun (JP); Hidetaka Azuma, Settsu (JP); Kou Sasaki, Settsu (JP); Yoshitaka Okagami, Settsu (JP)

(73) Assignees: Mazda Motor Corporation, Aki-gun (JP); Ashimori Industry Co., Ltd., Osaka-shi (JP)

( * ) Notice: Subject to any disclaimer, the term of this patent is extended or adjusted under 35 U.S.C. 154(b) by 0 days.

(21) Appl. No.: 15/026,002

(22) PCT Filed: Oct. 21, 2014

(86) PCT No.: PCT/JP2014/077901
§ 371 (c)(1),
(2) Date: Mar. 30, 2016

(87) PCT Pub. No.: WO2015/064416
PCT Pub. Date: May 7, 2015

(65) Prior Publication Data
US 2016/0221528 A1    Aug. 4, 2016

(30) Foreign Application Priority Data

Oct. 30, 2013  (JP) ................................. 2013-224998

(51) Int. Cl.
*B60R 21/233*    (2006.01)
*B60R 21/231*    (2011.01)
(Continued)

(52) U.S. Cl.
CPC .......... *B60R 21/233* (2013.01); *B60R 21/207* (2013.01); *B60R 21/23138* (2013.01);
(Continued)

(58) Field of Classification Search
CPC ................ B60R 21/233; B60R 21/207; B60R 21/23138; B60R 21/261; B60R 21/2346;
(Continued)

(56) References Cited

U.S. PATENT DOCUMENTS 5,945,184 A    8/1999   Nagata et al.
6,032,977 A    3/2000   Reh et al.
(Continued)

FOREIGN PATENT DOCUMENTS

CN    101879885 A    11/2010
CN    102341277 A    2/2012
(Continued)

OTHER PUBLICATIONS

International Search Report issued Jan. 27, 2015, in PCT/JP2014/077901 Filed Oct. 21, 2014.
(Continued)

*Primary Examiner* — Drew J Brown
(74) *Attorney, Agent, or Firm* — Oblon, McClelland, Maier & Neustadt, L.L.P.

(57) ABSTRACT

A side airbag device includes an inflator and an airbag. The airbag includes a deployable bag and a separator that separates the bag into a first chamber and a second chamber. The first chamber includes a support inflation portion and a protection inflation portion. The support inflation portion is deployable in such a shape that it gradually broadens from its lower end portion toward its upper end portion along a seat-side portion. The protection inflation portion is deployable at one end side of the support inflation portion. The inflator is disposed to supply a gas into the support inflation
(Continued)

portion. The separator includes at least one gas distribution hole in a portion thereof that separates the support inflation portion of the first chamber and the second chamber from each other. The second chamber is provided below the first chamber.

13 Claims, 12 Drawing Sheets

(51) Int. Cl.
  *B60R 21/207* (2006.01)
  *B60R 21/261* (2011.01)
  *B60R 21/239* (2006.01)
  *B60R 21/00* (2006.01)
  *B60R 21/2346* (2011.01)

(52) U.S. Cl.
  CPC .......... *B60R 21/261* (2013.01); *B60R 21/239* (2013.01); *B60R 21/2346* (2013.01); *B60R 2021/0006* (2013.01); *B60R 2021/0032* (2013.01); *B60R 2021/23146* (2013.01); *B60R 2021/23324* (2013.01)

(58) Field of Classification Search
  CPC .......... B60R 21/239; B60R 2021/0006; B60R 2021/0032; B60R 2021/23146; B60R 2021/23324
  See application file for complete search history.

(56) References Cited

U.S. PATENT DOCUMENTS

| | | | |
|---|---|---|---|
| 6,270,113 B1* | 8/2001 | Wipasuramonton | B60R 21/23138 280/728.1 |
| 6,478,329 B1* | 11/2002 | Yokoyama | B60R 21/23138 280/729 |
| 8,757,657 B1* | 6/2014 | Hotta | B60R 21/233 280/730.2 |
| 9,120,457 B2* | 9/2015 | Kino | B60R 21/207 |
| 2012/0181780 A1* | 7/2012 | Rickenbach | B60R 21/207 280/730.2 |
| 2015/0367806 A1* | 12/2015 | Fujiwara | B60R 21/233 280/729 |
| 2015/0367811 A1* | 12/2015 | Kobayashi | B60R 21/2346 280/730.2 |
| 2016/0075303 A1* | 3/2016 | Iida | B60R 21/2338 280/729 |
| 2016/0114757 A1* | 4/2016 | Fujiwara | B60R 21/23138 280/729 |
| 2016/0200280 A1* | 7/2016 | Fujiwara | B60N 2/42 280/729 |
| 2016/0264091 A1* | 9/2016 | Fujiwara | B60R 21/2346 |

FOREIGN PATENT DOCUMENTS

| | | |
|---|---|---|
| CN | 102371961 A | 3/2012 |
| CN | 102695634 A | 9/2012 |
| JP | 9-295545 A | 11/1997 |
| JP | 10-35399 A | 2/1998 |
| JP | 2000-318565 A | 11/2000 |
| JP | 2009-227020 A | 10/2009 |
| JP | 5473812 B2 | 2/2014 |
| WO | 2013/157082 A1 | 10/2013 |

OTHER PUBLICATIONS

International Preliminary Report on Patentability and Written Opinion issued on May 12, 2016 in PCT/JP2014/077901 (with English language translation).

Office Action issued Apr. 26, 2017 in Chinese Patent Application No. 201480059760.8 (with partial English translation).

* cited by examiner

F I G. 1 3
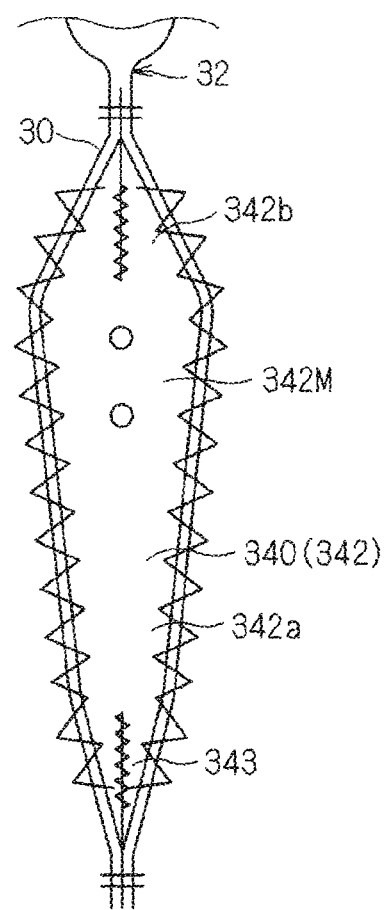
F I G. 1 4
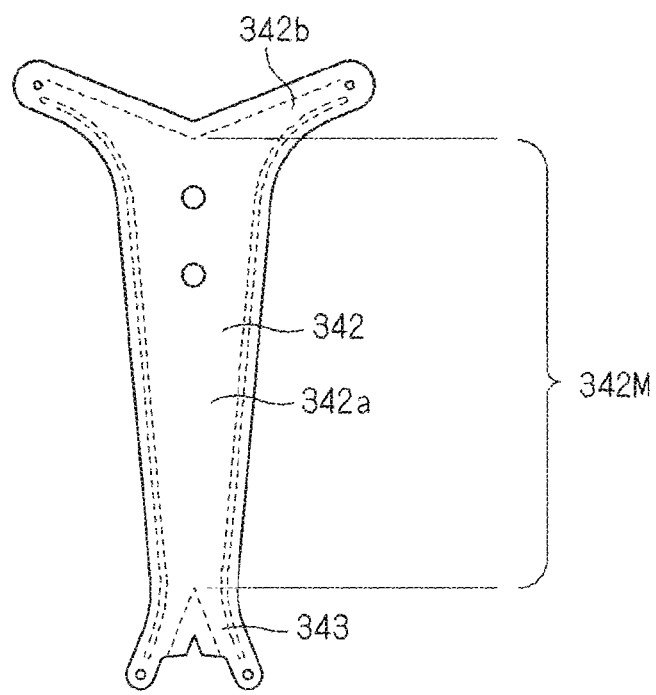

SIDE AIRBAG DEVICE

TECHNICAL FIELD

The present invention relates to a side airbag device to be incorporated in a side portion of a seat of a vehicle.

BACKGROUND ART

Patent Document 1 discloses a side airbag to be installed in a side portion of a seatback of a vehicle seat close to outside of a vehicle.

Internal of the side airbag are formed a first flow path and a second flow path. The first flow path causes a gas ejected from gas ejection ports of an inflator to flow toward the upper portion of an airbag that protects the side of the occupant's head. The second flow path causes the gas to flow from the upper portion of the airbag toward the lower portion of the airbag that protects the side of the occupant's chest. The airbag is configured to in, for example, a vehicle side-impact collision, cause a gas to flow from the inflator into the first flow path to inflate and deploy the upper portion of the airbag toward the side of the head, and simultaneously, cause the gas to flow from the upper portion of the airbag into the second flow path to inflate and deploy the lower portion of the airbag toward the side of the chest.

At the intermediate position of the side airbag in its front-rear direction is formed a seam portion obtained by overlapping and sewing left and right base fabrics. The first flow path is formed between the seam portion and the upper half portion of the rear edge of the side airbag. The second flow path is formed between the upper edge of the seam portion and the front edge of the side airbag.

PRIOR ART DOCUMENT

Patent Document

Patent Document 1: Japanese Patent Application Laid-Open No. 2009-227020

SUMMARY OF INVENTION

Problem to be Solved by the Invention

Unfortunately, in the technology disclosed in Patent Document 1, the gas ejected from the inflator passes through the first flow path between the seam portion and the upper half portion of the rear edge of the side airbag to flow into the upper portion of the airbag, and simultaneously, flow into the lower end portion of the airbag. Since only a slight amount of clearance is left between an occupant and a door, when the lower end portion of the airbag is inflated widely before being deployed toward the side of the occupant's abdomen, it may be difficult to inflate the lower portion of the airbag in a desired shape.

For a side airbag that is inflated from the side portion of a seat, at the initial stage of deployment with a low internal pressure, the side airbag projected from the side surface of the seat may once project toward the outside of the vehicle and then hit against the door or pillar and, in reaction to the hit, may be deployed toward the occupant. It is accordingly difficult to control the direction of deployment.

The present invention therefore has an object to provide a side airbag device capable of deploying the entire airbag of the side airbag device in a normal position quickly and accurately and inflating the deployed airbag in a desired shape.

Means to Solve the Problem

To solve the problem above, a first aspect relates to a side airbag device capable of being incorporated in a seat-side portion of a vehicle. The side airbag device includes an inflator, and an airbag including a bag that is inflatable and a separator that separates the bag into a first chamber and a second chamber. The first chamber includes a support inflation portion and a protection inflation portion. The support inflation portion is deployable in such a shape that the support inflation portion gradually broadens from its lower end portion toward its upper end portion along the seat-side portion. The protection inflation portion is deployable above the upper end portion of the support inflation portion. The inflator is disposed so as to supply a gas into the support inflation portion. The separator includes at least one gas distribution hole. The second chamber is located below the first chamber.

In a second aspect, in the side airbag device according to the first aspect, the lower end portion of the support inflation portion is located at a lower edge of an overlapping portion of the airbag, the overlapping portion being disposed and deployable to overlap the seat-side portion.

In a third aspect, in the side airbag device according to the first or second aspect, a side portion of the support inflation portion between the separator and a rear portion opposing the portion of the separator is provided to be abuttable against the seat-side portion entirely in a direction in which the side portion extends.

In a fourth aspect, in the side airbag device according to any one of the first to third aspects, the separator is a belt-shaped partition having both end portions joined to portions of the bag that oppose the both end portions.

In a fifth aspect, in the side airbag device according to the fourth aspect, an intermediate portion of the partition in its extension direction is formed with a width varying along the extension direction.

In a sixth aspect, in the side airbag device according to any one of the first to fifth aspects, the second chamber includes a gas exhaust port.

Effects of the Invention

According to the first aspect, a gas supplied from the inflator is introduced into the support inflation portion. The support inflation portion has such a shape that the support inflation portion gradually broadens from its lower end portion toward its upper end portion. The gas from the inflator accordingly passes through the support inflation portion to flow into the protection inflation portion, thereby deploying the protection inflation portion to the side of the upper part of the occupant at once. The space between the seat-side portion and the side wall inside the vehicle usually widens upwardly, so that the first chamber can be inflated and deployed quickly. As the first chamber is inflated and deployed, the second chamber is deployed between the side wall inside the vehicle and the occupant below the first chamber.

In this case, although a gas flows into the second chamber from the first chamber through the gas distribution hole of the separator, the flow rate of the gas is smaller than the flow rate of a gas into the upper end portion of the support inflation portion and the protection inflation portion. The second chamber is accordingly deployable between the side wall inside the vehicle and the occupant before being inflated in a desired shape. Thus, irrespective of the size of the second chamber, the second chamber easily comes in between the side wall inside the vehicle and the occupant to be disposed in a normal deployment area, and then, can be fully inflated in a desired shape. In this manner, the entire airbag can be deployed quickly and accurately in a normal area and, after being deployed, can be inflated in a desired shape.

According to the second aspect, the lower end portion of the support inflation portion is provided at the lower edge of the overlapping portion, which is disposed to overlap the seat-side portion, of the airbag. This allows the support inflation portion to easily come in a narrow space between the seat-side portion and the side wall inside the vehicle while the support inflation portion is being inflated, so that the lower portion of the second chamber can be disposed in a desired deployment area more quickly and more accurately.

According to the third aspect, of the support inflation portion, the side portion between the portion of the separator and the rear portion opposing the portion corresponding the separator is provided to be abuttable against the seat-side portion across the direction in which the side portion extends. While the support inflation portion is being inflated, accordingly, the support inflation portion is inflated while abutting against the seat-side portion. Thus, the first chamber can accordingly be inflated and deployed more reliably along the seat-side portion, thereby more reliably controlling the direction in which the first chamber is deployed.

According to the fourth aspect, providing a belt-shaped partition as a separator can provide a thickness to the airbag in the vehicle width direction at the separator between the first chamber and the second chamber. This also allows the portion of the airbag adjacent to the separator to have a function for protecting an occupant, thereby facilitating adjustment according to the seat shape and the part of the occupant to be protected.

According to the fifth aspect, the width of the intermediate portion of the belt-shaped separator is partially changed in accordance with the shape of the side wall inside the vehicle, the shape of the seat or pillar, or other shape, or in accordance with the part of the occupant to be protected, thereby efficiently inflating and deploying the airbag even in a narrow space between the occupant and the side wall inside the vehicle. Additionally, the thickness of the airbag in the vehicle width direction can be easily set such that the occupant can be protected efficiently.

According to the sixth aspect, by providing a gas exhaust port in the second chamber, a difference in internal pressure can be provided between the first chamber and the second chamber. Thus, the firmness (reaction force) of the airbag can be adjusted easily in accordance with the part of the occupant to be protected.

BRIEF DESCRIPTION OF DRAWINGS

FIG. 13 is a schematic cross-sectional view taken along the line XIII-XIII of FIG. 12.

FIG. 14 shows the shape of a partition fabric for forming a partition.

DESCRIPTION OF EMBODIMENTS

Embodiments

Figure 1:
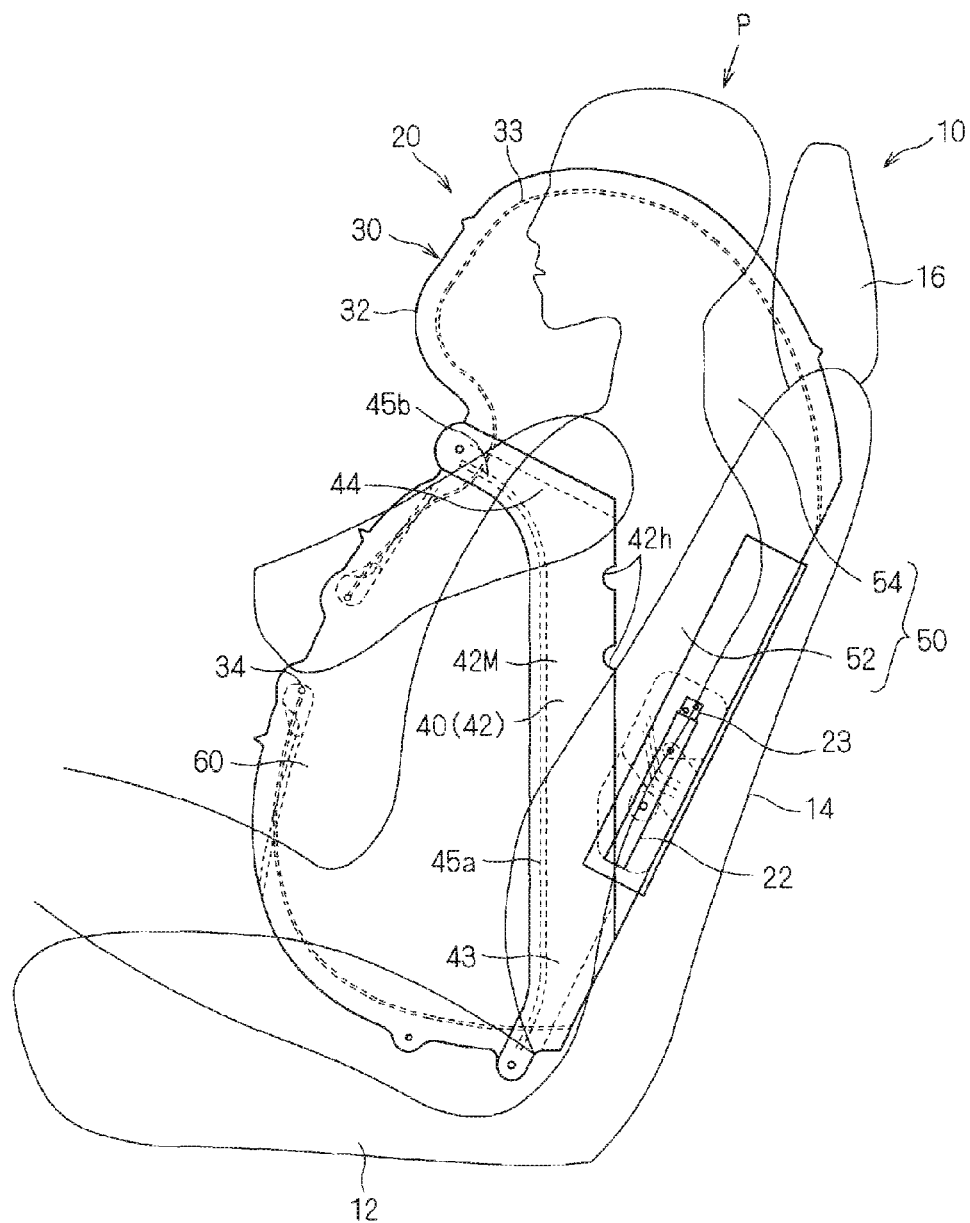
FIG. 1 is a schematic side view of a side airbag device according to an embodiment, which is incorporated in a vehicle seat.
Figure 2:
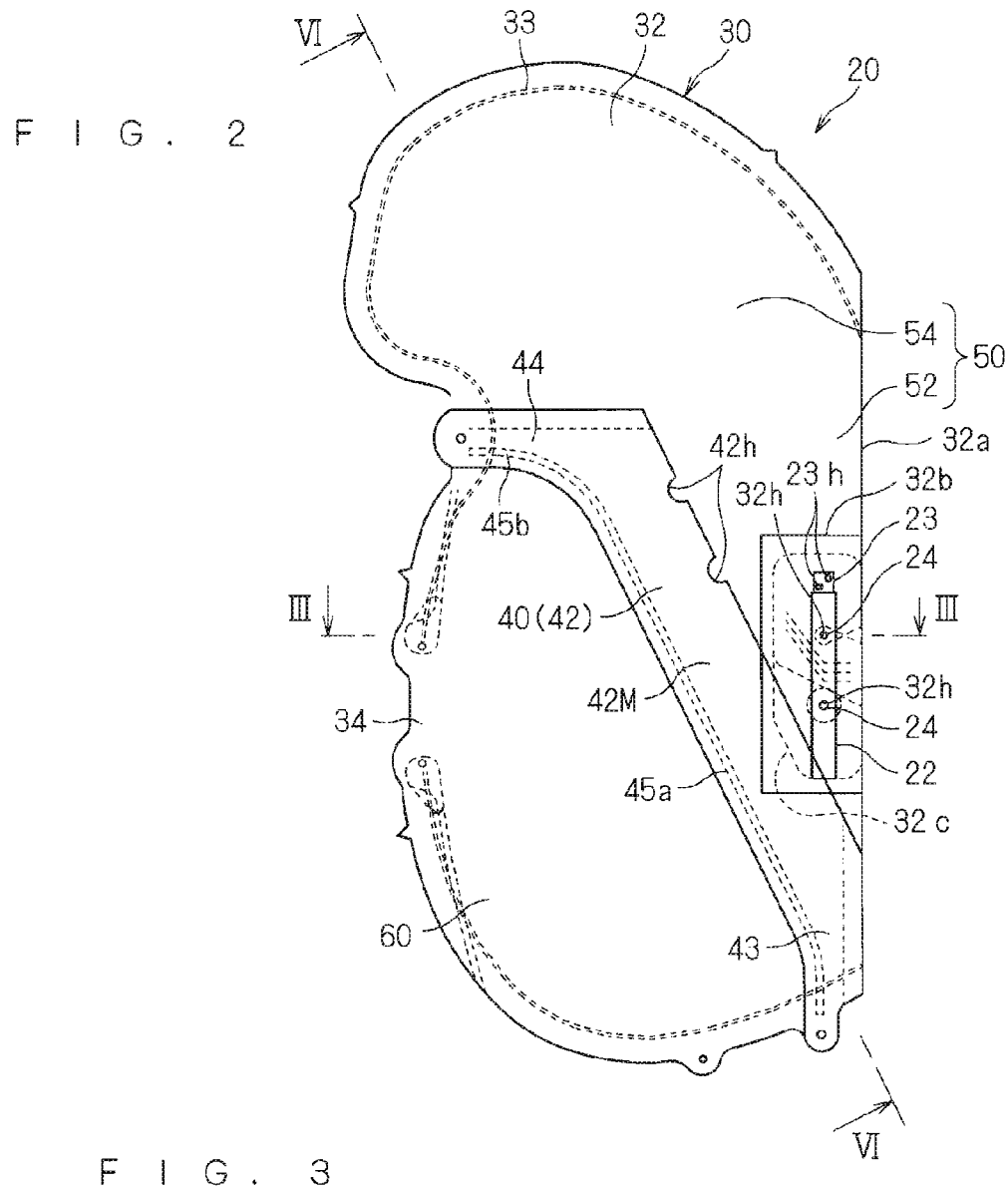
FIG. 2 is a schematic side view of the side airbag device.
Figure 3:
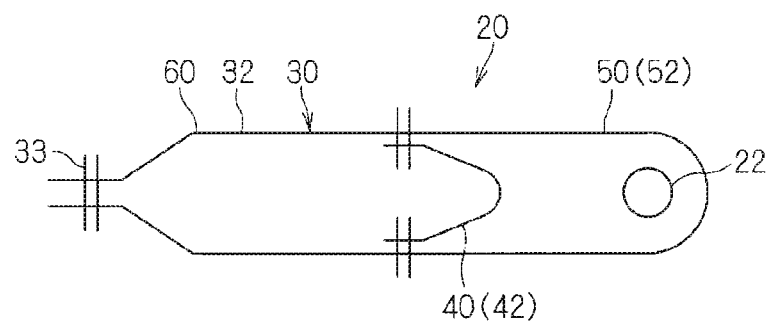
FIG. 3 is a schematic cross-sectional view taken along the line III-III of FIG. 2.
Figure 4:
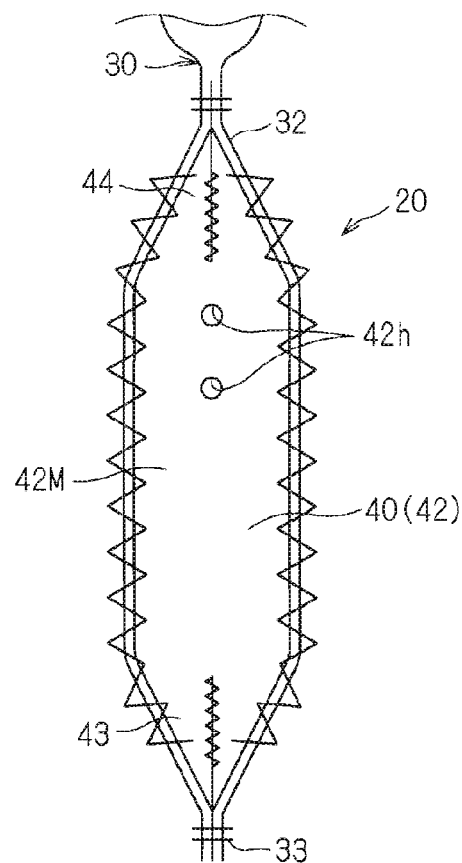
FIG. 4 is a schematic cross-sectional view taken along the line IV-IV of FIG. 2.

A side airbag device according to an embodiment will be described below. FIG. 1 is a schematic side view of a side airbag device 20 according to the embodiment, which is incorporated in a vehicle seat 10. FIG. 2 is a schematic side view of the side airbag device 20. FIG. 3 is a schematic cross-sectional view taken along the line of FIG. 2. FIG. 4 is a schematic cross-sectional view taken along the line IV-IV of FIG. 2. In the schematic side views of the side airbag device 20, the internal components may also be indicated by solid lines.

The side airbag device 20 is configured to be attachable to the vehicle seat 10.

The vehicle seat 10 includes a seat portion 12, a backrest 14, and a headiest 16. Assumed as the vehicle seat 10 is, for example, a driver's seat or a passenger's seat of a vehicle.

To one side of the vehicle seat 10, for example, an openable door, a pillar, and the like are provided as the side wall inside the vehicle. The side airbag device 20 is provided in the side portion of the vehicle seat 10 that faces the side wall of the vehicle (herein, the side portion of the backrest 14). The side airbag device 20 can be attached to the vehicle seat 10 by, for example, attaching an inflator 22 to the frame portion in the vehicle seat 10 with a screw or the like, with an airbag 30 folded. For example, upon impact on the side of the vehicle, the airbag 30 of the side airbag device 20 is inflated to be deployed between the side of the occupant P and the side wall inside the vehicle. This causes the inflated and deployed airbag 30 to protect the shoulder, torso, and the like of the occupant P. The side airbag device 20 may be provided in, for example, the side portion of a backseat.

The side airbag device 20 includes the inflator 22 and the airbag 30.

The inflator 22 is formed in an elongated shape, here, a cylinder shape. A gas generating agent, an ignition device, and the like are built in the inflator 22. At one end of the inflator 22 is provided a gas ejection part 23. The gas ejection part 23 is formed into a cap in which gas ejection holes 23*h* are formed on its outside and its outer peripheral portion. The inflator 22 causes the ignition device to ignite upon receipt of an ignition order signal or the like from the impact detecting part or any other part of the vehicle and burns the gas generating agent through this ignition, thereby supplying a gas ejected through the burning toward the inside of the airbag 30 through the gas ejection part 23. The gas ejection directions in the gas ejection part 23 are, for example, the direction in which the inflator 22 extends outwardly and the radially outward direction of the inflator 22 around its axis. The inflator 22 is attached to the airbag 30 so as to supply a gas into the airbag 30. Herein, screw portions 24 are provided in the outer peripheral portion of the inflator 22 in a projecting manner, and the inflator 22 is fixedly attached to the airbag 30 with the screw portions 24. The position at which and the arrangement in which the inflator 22 is fixed to the airbag 30 will be described below in more detail.

The airbag 30 includes a bag 32 and a partition 40 that serves as a separator.

The bag 32 is configured to be inflatable by the gas supplied from the inflator 22. In other words, the bag 32 is formed by, for example, sewing a base fabric cut in a predetermined shape such that the bag 32 can be inflated and deployed in a flat shape between the occupant sitting in the vehicle seat 10 and the side wall of the vehicle. Herein, the bag 32 is formed in a bag shape by folding the base fabric in half and joining the outer peripheral portion thereof other than a turnover portion 32*a* through sewing or the like to form a joint portion 33. The base fabric may be, for example, a woven fabric applied with silicone or the like. Herein, the outer peripheral portion of the bag 32 is double stitched, which may be single stitched or at least triple stitched.

Of the outer peripheral portion of the bag 32, the portion between a vertically intermediate portion and a lower portion of the bag 32 is not sewn. In this portion, a vent hole 34 is formed as a gas exhaust port that causes the bag 32 to communicate with the outside of the outer peripheral portion. The vertically intermediate portion and the lower portion of the sewn portion of the bag 32 are a portion that defines a second chamber 60 described below, and thus, the vent hole 34 is formed in the second chamber 60. Of the joint portion 33, the end portions at the vent hole 34 side and the base fabric portions on their peripheries are reinforced by joint portions (sewn portions) formed so as to surround the end portions of the joint portion 33. This makes it difficult for the joint portion 33 to rupture in the end portions at the vent hole 34 side.

With the side airbag device 20 attached to the backrest 14 of the vehicle seat 10, the portion of the bag 32, which serves as a fold, is disposed along the side portion of the backrest 14. In this attached state, the upper portion of the bag 32 is formed to be wider than the vertically intermediate portion and the lower portion of the bag 32. And the upper portion of the bag 32 is formed in such a shape that extends to the area lateral to the shoulder of the occupant P sitting in the vehicle seat 10. The vertically intermediate portion and the lower portion of the bag 32 are formed to be narrower than the upper portion of the hag 32. And these portions are formed in such a shape that extend to the area lateral to the torso (for example, the back, abdomen, and chest) of the occupant P sitting in the vehicle seat 10.

The inflator 22 is attached to a portion, which is to be attached to the backrest 14 of the vehicle seat 10, of the bag 32 in such a manner that the inflator 22 extends along the direction in which the backrest 14 extends vertically. More specifically, the inflator 22 is fixedly attached to the internal portion of the turnover portion 32*a* of the bag 32, with its longitudinal direction aligned with the turnover portion 32*a* of the bag 32. The inflator 22 is fixedly attached with the configuration below. That is to say, a plurality of (herein, two) screw portions 24 are provided in the inflator 22 in a projecting manner with an interval in the inflator 22 along its longitudinal direction. With the inflator 22 disposed in the bag 32, the screw portions 24 are disposed so as to project outwardly through attachment holes 32*h* formed in the bag 32. A reinforcing fabric 32*b* overlaps the portion, on which the inflator 22 is fixedly attached, of the bag 32, and a joint portion 32*c* that is, for example, sewn maintains the overlap. Threadedly engaging nuts (not shown) with the screw portions 24 causes the bag 32 and the reinforcing fabric 32*b* to be retained between the inflator 22 and the nuts, so that the inflator 22 is fixedly attached at a predetermined position of the bag 32. In this state, the inflator 22 is positioned along the turnover portion 32*a* (that is, the backrest 14), and the gas ejection part 23 is positioned upwardly (that is, toward the protection inflation portion 54 of the first chamber 50 described below).

Figure 5:
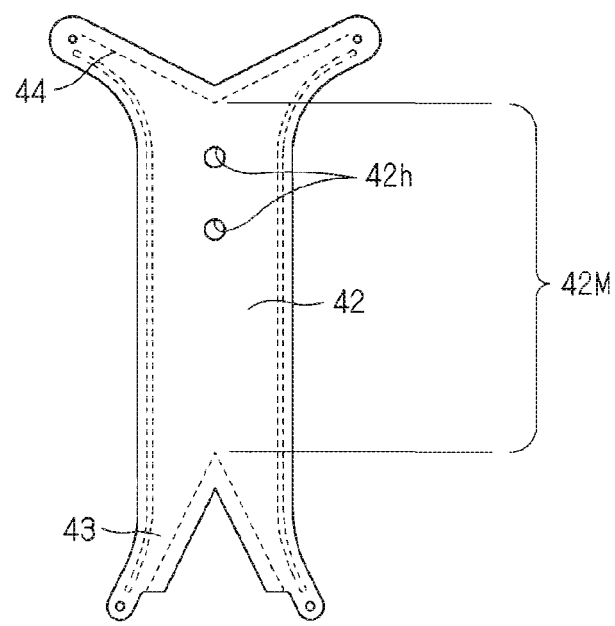
FIG. 5 shows the shape of a partition fabric for forming a partition.

The partition 40 is configured to separate the bag 32 into the first chamber 50 and the second chamber 60. In this embodiment, the partition 40 is formed in a belt shape. FIG. 5 shows the shape of a partition fabric 42 for foaming the partition 40. Similarly to the base fabric forming the bag 32, the partition fabric 42 may be a woven fabric applied with silicone. An intermediate portion 42M of the partition fabric 42 in its longitudinal direction is formed into a belt with a width constant in its extending direction. One end portion 43 and the other end portion 44 of the partition fabric 42 are formed in such a shape that these portions spread in a V shape. The spread angle of the one end 43 of the partition fabric 42 is smaller than the spread angle of the other end 44 of the partition fabric 42.

The partition fabric 42 is folded in half along the line at the center in its width direction, and the inner edge portions inside the one end portion 43 and the other end portion 44, which spread in a V shape, are each joined by sewing or the like, so that the one end portion 43 and the other end portion 44 of the partition fabric 42 are inclined to the intermediate portion 42M of the partition fabric 42 at the side at which the partition fabric 42 is folded. At this time, the other end portion 44 of the partition fabric 42 gradually narrows toward its end portion while being inclined to the intermediate portion 42M of the partition fabric 42 with an angle greater than that of the one end portion 43 of the partition fabric 42. The one end portion 43 of the partition fabric 42 gradually narrows toward its end portion. The reason why the other end portion 44 of the partition fabric 42 is inclined to the one end portion 43 of the partition fabric 42 is to join the partition fabric 42 along lines 45*a* and 45*b* described below. The reason why the one end portion 43 and the other end portion 44 of the partition fabric 42 gradually narrow toward their end portions is to conform these portions to the shape of the deployed bag 32 that has a gradually reducing thickness toward its peripheral portion.

In the intermediate portion 42M of the partition fabric 42 are formed gas distribution holes 42*h*. Herein, two gas distribution holes 42*h* are formed in the central portion of the intermediate portion 42M of the partition fabric 42 in the width direction. Herein, the gas distribution holes 42*h* are formed in a circular shape. The size, the shape, and the number of gas distribution holes 42*h* are appropriately adjusted in accordance with, for example, the flow rate and the amount of a gas to flow from the first chamber 50 into the second chamber 60. The positions at which the gas distribution holes 42h are formed will be described further below in the context of the entire configuration of the airbag 30.

Both side portions of the partition 40 are joined to the portions of the bag 32 that face the both side portions by sewing or the like, so that the partition 40 separates the bag 32 into the first chamber 50 and the second chamber 60.

More specifically, the inner edge portions of the one end portion 43 and the inner edge portions of the other end portion 44 of the partition fabric 42 that forms the partition 40 are each joined by sewing or the like. In this state, the one end portion 43 and the other end portion 44 of the partition fabric 42 gradually narrow toward their tips.

The both side portions of the partition fabric 42 are joined by, for example, being sewn to the bag 32 along the line 45a and the line 45b with the base fabric, which forms the bag 32, folded in half. The line 45a is inclined upwardly from the bottom in such a direction that the line 45a is farther from the turnover portion 32a. The line 45b starts from the upper-side end portion of the line 45a and extends in such a direction that the line 45b is farther from the turnover portion 32a. Herein, the both side portions of the partition fabric 42 are each joined to the bag 32 by double sewing lines. The line 45a starts from the position closer to the turnover portion 32a in the lower edge portion of the bag 32 and is formed so as to reach the position that is vertically located between the upper portion and the vertically intermediate portion of the bag 32 and is located between the turnover portion 32a and the joint portion 33 facing the turnover portion 32a. The inflator 22 is parallel to the turnover portion 32a and is oblique to the portion of the partition 40 that is disposed along the line 45a. The lower end portion of the line 45a is inclined to the longitudinal intermediate portion of the line 45a and extends in parallel to the turnover portion 32a to reach the joint portion 33 at the lower side of the bag 32. The line 45b is formed so as to extend from the upper end portion of the line 45a toward the side opposite to the turnover portion 32a along the direction in which the line 45b is perpendicular to the turnover portion 32a to reach the joint portion 33.

The bag 32 is separated by the partition 40 joined along the lines 45a and 45b into the upper first chamber 50 and the lower second chamber 60 along the direction in which the backrest 14 extends vertically. Herein, the portion, which is disposed along the line 45a, of the partition 40 is provided at the position distanced from the side of the inflator 22 in such a manner that the portion is inclined to the direction in which the inflator 22 extends. This portion serves as a first separator that separates a support inflation portion 52 (described below) of the first chamber 50 and the second chamber 60 from each other in the deployed bag 32. The portion, which is disposed along the line 45b, of the partition 40 is consecutively provided at the other end portion of the first separator and is provided to be inclined more than the first separator to the direction in which the inflator 22 extends. This portion serves as a second separator that separates a protection inflation portion 54 (described below) of the first chamber 50 and the second chamber 60 from each other in the deployed bag 32.

The first chamber 50 is formed in such a shape that it includes the support inflation portion 52 and the protection inflation portion 54. The support inflation portion 52 is configured to be deployable in such a shape that the support inflation portion 52 gradually broadens from its lower end portion toward its upper end portion along the side portion of the seat 10 (specifically, the side portion of the backrest 14). The protection inflation portion 54 is configured to be deployable at the upper end side of the support inflation portion 52.

More specifically, the support inflation portion 52 is formed between the turnover portion 32a of the bag 32 and the portion, which is disposed along the line 45a, of the partition 40. That is to say, the line 45a is inclined to be farther from the turnover portion 32a, from the lower portion to the upper portion of the turnover portion 32a. Thus, when a gas is introduced into the portion of the bag 32 at the side close to the turnover portion 32a with respect to the partition 40 disposed along the line 45a, this portion inflates into a conical shape or pyramid shape gradually broadening upward. This portion is the support inflation portion 52.

The inflator 22 is disposed so as to supply a gas into the support inflation portion 52. Herein, the inflator 22 is provided in the support inflation portion 52 in such a manner that its extension direction extends along the direction in which one end portion and the other end portion of the support inflation portion 52 are linked. More specifically, the inflator 22 is fixedly attached in the portion (herein, the portion corresponding to the longitudinal intermediate portion of the turnover portion 32a) that is the internal portion of the turnover portion 32a of the bag 32 and forms the support inflation portion 52, with the gas ejection part 23 directed toward the protection inflation portion 54. As a result, the gas ejected from the inflator 22 is supplied directly into the support inflation portion 52 and inflates the support inflation portion 52.

The support inflation portion 52 serves to restrict the movement of the back of the torso of the occupant P and protect the back at the early stage in which the airbag 30 is inflated and deployed. The support inflation portion 52 projects so as to rise upward from the side portion of the backrest 14 to which the inflator 22 and the side airbag device 20 are attached, and thus serves to support the protection inflation portion 54 such that the protection inflation portion 54 is located adjacent to the back of the occupant P.

With the support inflation portion 52 inflated and deployed, the side portion (the portion facing the backrest 14) of the support inflation portion 52 between the portion of the partition 40 (specifically, the portion of the partition 40 disposed along the line 45a) and the rear portion (herein, the turnover portion 32a) facing the portion of the partition 40 abuts against the side portion of the backrest 14 entirely in the direction in which the side portion extends. More specifically, the side portion, which faces the backrest 14 in the vehicle width direction, of the support inflation portion 52 abuts against the side portion of the backrest 14 along the line extending in the direction in which the backrest 14 extends vertically. Thus, the support inflation portion 52 is inflated and deployed reliably and smoothly along the side portion of the backrest 14 while abutting against the side portion, and is difficult to be deployed in any other direction, for example, toward the occupant.

With the support inflation portion 52 inflated and deployed, the lower end portion of the support inflation portion 52 is provided so as to reach the lower edge of the overlapping portion, which is disposed to overlap the side portion of the backrest 14 that is the side portion of the seat 10 in side view, of the airbag 30. When the lower end portion of the support inflation portion 52 is inflated and deployed, accordingly, the lower end portion of the support inflation portion 52 can be smoothly inflated and deployed in such a manner that the lower end portion comes in a narrow space between the side portion of the backrest 14 and the side wall inside the vehicle along the side portion.

The protection inflation portion 54 is inflated at the other end portion of the support inflation portion 52. The protection inflation portion 54 is preferably configured to be deployable with a width (herein, the width is in the front-rear direction of the vehicle) and a thickness (herein, the thickness is in the vehicle width direction) greater than those of the other end portion of the support inflation portion 52. Needless to say, the protection inflation portion is not always required to be deployable with a width and a thickness greater than those of other end portion of the support inflation portion. Alternatively, at least one of the width and thickness of the protection inflation portion may be set to be comparable to or smaller than that of the other end portion of the support inflation portion.

The deployment position of the inflated protection inflation portion 54 is corresponding preferably to the shoulder of the occupant P sitting in the vehicle seat 10. The protection inflation portion 54 accordingly serves to lessen the impact upon the shoulder of the occupant P.

Needless to say, the protection inflation portion 54 may be configured to be deployable at a position corresponding to any other part of the occupant P, for example, the head of the occupant P.

The second chamber 60 is provided below the first chamber 50, specifically, below the first chamber 50 in the direction in which the side portion of the backrest 14 that is the side portion of the seat 10 extends, and is configured to be deployable below the first chamber 50. Herein, the second chamber 60 includes a portion located below a widely inflated portion at the upper side of the support inflation portion 52 (a portion, which is located below the line 45a in the direction extending along the turnover portion 32a, of the second chamber 60) and a portion located below the protection inflation portion 54 (a portion, which is located below the line 45b in the direction extending along the turnover portion 32a, of the second chamber 60). The deployment position of the second chamber 60 is corresponding preferably to the front torso (the abdomen, chest, and the like) of the occupant P sitting in the vehicle seat 10. Consequently, the second chamber 60 can serve to lessen the impact upon the front torso of the occupant P.

At least one gas distribution hole 42h is formed in the portion, which separates the support inflation portion 52 of the first chamber 50 and the second chamber 60 from each other, of the partition 40. That is, the gas distribution hole 42h is formed in the portion, which serves as the first separator disposed along the line 45a, of the partition 40. Herein, though two gas distributuin holes 42h are formed, it suffices that at least one gas distribution hole is provided. Furthermore, the gas distribution hole may be formed at any position of the partition 40 and, for example, may be formed in the portion serving as the second separator.

The gas supplied from the inflator 22 into the support inflation portion 52 of the first chamber 50 is introduced into the second chamber 60 through the gas distribution holes 42h.

The gas from the inflator 22 is directly introduced into the first chamber 50, whereas the gas is introduced from the first chamber 50 into the second chamber 60 through the gas distribution holes 42h formed in the partition 40. Thus, the first chamber 50 is a chamber with a pressure higher than that of the second chamber 60, and the second chamber 60 is a chamber with a pressure lower than that of the first chamber 50.

At least one of the at least one gas distribution hole 42h is preferably provided on the extension of the direction in which a gas is ejected from the inflator 22.

At least one of the gas distribution holes 42h may be located on the extension of the direction in which a gas is ejected from the inflator 22, at any stage of the airbag 30 changing from the initial state to the most widely deployed state.

Figure 6:
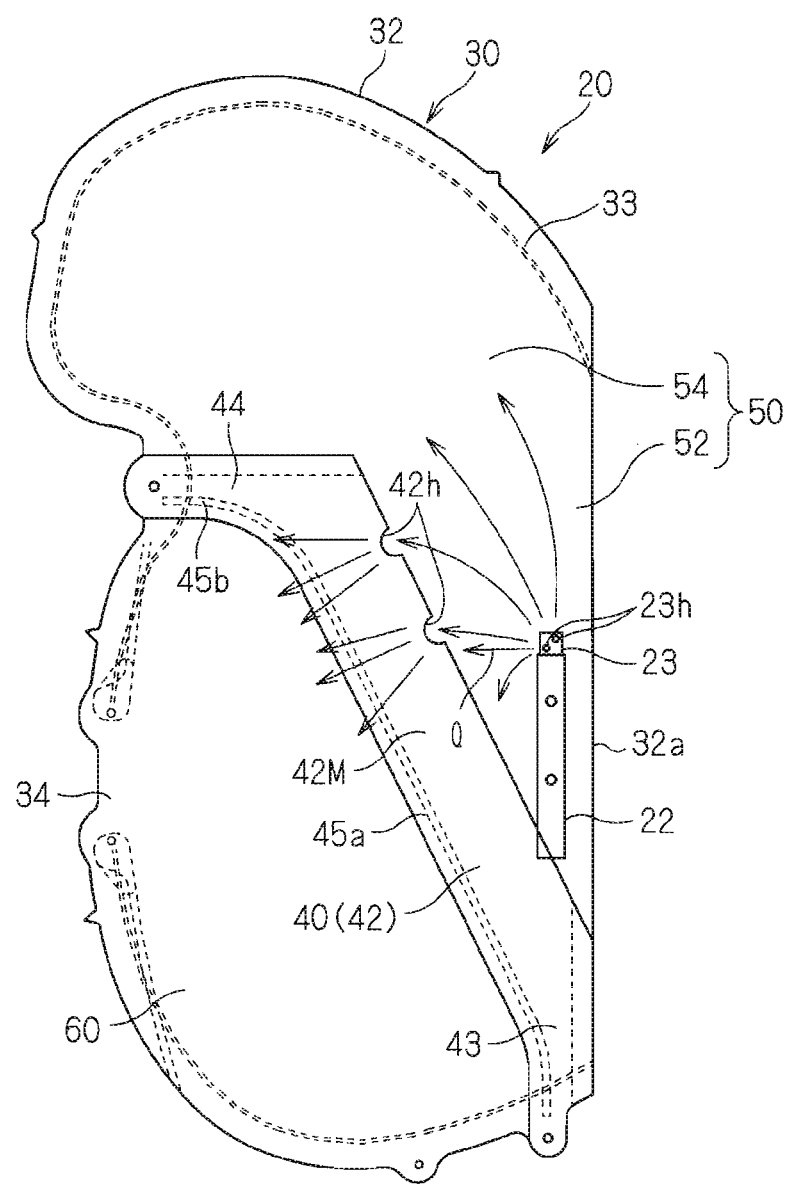
FIG. 6 is a view for explaining an operation in which the side airbag device is deployed.
Figure 7:
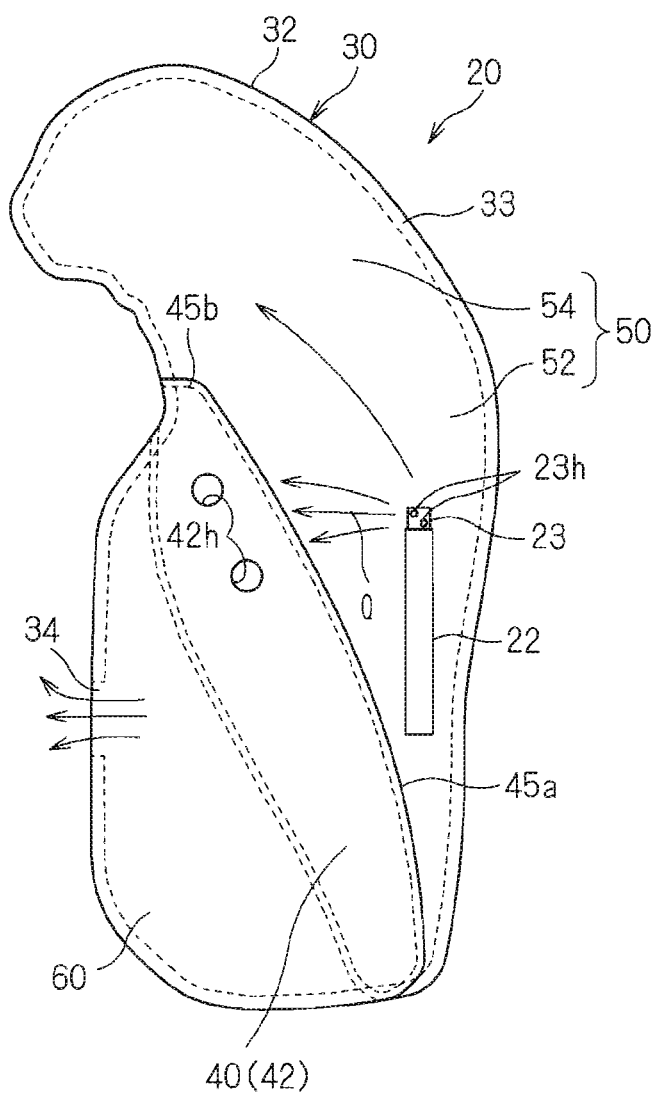
FIG. 7 is another view for explaining the operation in which the side airbag device is deployed.

Herein, one of the directions in which a gas is ejected from the inflator 22 is directed toward the partition 40 in the airbag 30 in the direction perpendicular to the direction in which the inflator 22 extends. In the initial state, one of the gas distribution holes 42h is located above the direction Q in which the gas is ejected from the inflator 22 (see the lower gas distribution hole 42h of FIG. 6). The portion of the partition 40 formed along the line 45a (that is, the portion in which the gas distribution holes 42h are formed) is oblique to the direction in which the inflator 22 extends, and when the airbag 30 is inflated and deployed widely, the one gas distribution hole 42h is located below the direction Q in which a gas is ejected from the inflator 22 (see the lower gas distribution hole 42h of FIG. 7). Thus, the one gas distribution hole 42h is located on the extension of the direction Q in which a gas is ejected while the airbag 30 is being inflated and deployed widely from the initial state. At the stage in which the one gas distribution hole 42h is located on the extension of the direction Q in which a gas is ejected, the gas ejected from the inflator 22 effectively flows into the second chamber 60 through the one gas distribution hole 42h. This enables the second chamber 60 to be inflated reliably.

Figure 9:
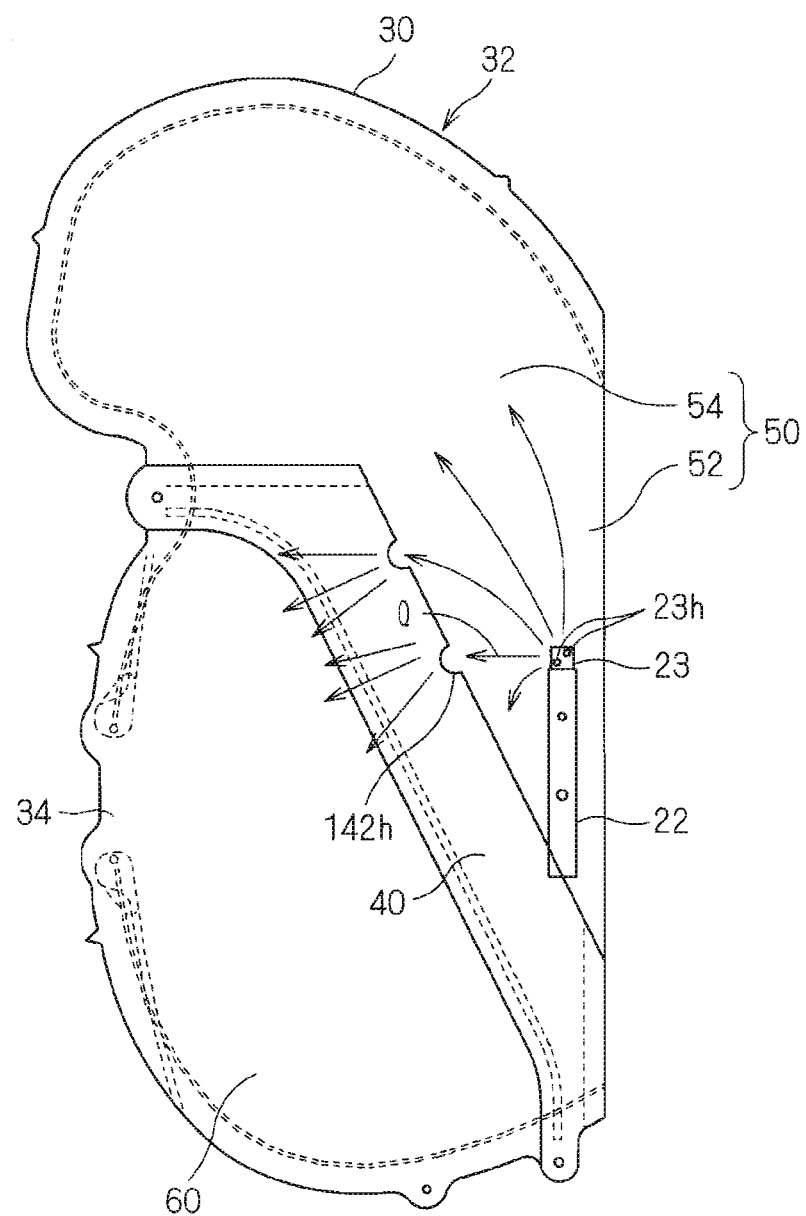
FIG. 9 is a schematic side view of a side airbag device according to a first modification.

As described above, it suffices that at least one gas distribution hole 42h is located on the extension of the direction Q in which a gas is ejected from the inflator 22, at any stage of the airbag 30 changing from the initial state to the most widely deployed state. As in a first modification shown in FIG. 9, thus, at the initial stage in which the airbag 30 is not inflated, a gas distribution hole 142h corresponding to the gas distribution hole 42h may be present on the extension of the direction Q in which a gas is ejected from the inflator 22 (see a lower gas distribution hole 142h of FIG. 9). In this case, also at the initial stage, the gas from the inflator 22 is blown toward the gas distribution hole 142h more directly to be introduced into the second chamber 60, so that the second chamber 60 can be initially inflated to some extent from the initial stage.

Needless to say, with the side airbag device 20 incorporated in the vehicle seat 10, the gas distribution hole 42h is preferably formed at a position except for the position corresponding to the projecting portion of the side wall inside the vehicle (for example, the armrest portion of the door, an operation panel portion in which a switch for opening/closing a window or for locking/unlocking a door is incorporated, or any other portion). Thus, when the side wall inside the vehicle projects toward the side airbag device 20 and deforms due to, for example, the impact from the outside of the vehicle, the good open state of the gas distribution hole 42h can be maintained, so that the second chamber 60 can be inflated and deployed smoothly.

The airbag 30 is configured to, when being fully deployed, exhaust a gas more easily from the second chamber 60 than from the first chamber 50. Herein, the configuration above is achieved with the configuration below.

In other words, the vent hole 34 is formed in the second chamber 60 as described above. In contrast, no vent hole 34 is formed in the first chamber 50. Thus, the gas introduced into the first chamber 50 inflates and deploys the first chamber 50 with few leaks, and flows into the second chamber 60 to inflate and deploy the second chamber 60. Then, the gas flows from the second chamber 60 through the vent hole. In this manner, the second chamber 60 can easily exhaust a gas through the vent hole 34. Needless to say, a vent hole may be formed also in the first chamber. In this case, the amount of the gas exhausted through the vent hole of the second chamber may be set to be greater than the amount of the gas exhausted through the vent hole of the first chamber by, for example, setting the size of the vent hole of the first chamber to be smaller than the size of the vent hole of the second chamber such that the second chamber exhausts a gas more easily than the first chamber.

The operation of the side airbag device 20 configured as described above will be described.

In the standby state, first, the inflator 22 of the side airbag device 20 is attached to the side portion of the backrest 14 of the vehicle seat 10, and the airbag 30 is folded. The airbag 30 may be folded in a bellows shape or may be folded in a roll shape.

In this state, when the inflator 22 operates in a vehicle collision or the like, a gas is ejected from the inflator 22. The gas from the inflator 22 is first supplied into the support inflation portion 52 of the first chamber 50 (see FIGS. 1 and 6). The support inflation portion 52 is formed in such a shape (herein, a conical shape) that the support inflation portion 52 broadens from s lower end portion toward its upper end portion, and thus, the gas flows into the upper end portion of the support inflation portion 52 and the protection inflation portion 54 at once. As a result, the upper end portion of the support inflation portion 52 and the protection inflation portion 54 are deployed toward the side of the upper portion of the occupant P. The support inflation portion 52 and the overlapping portion of the protection inflation portion 54 at the side close to the backrest 14 are inflated and deployed while abutting against the backrest 14 along the side portion of the backrest 14 that is the side portion of the seat 10. Consequently, the inflated first chamber 50 is also deployed in a predetermined area between the side wall inside the vehicle and the occupant P while being supported by the side portion of the backrest 14 that is the side portion of the seat 10. In particular, the lower end portion of the support inflation portion 52 is provided on the lower edge of the overlapping portion, which is disposed to overlap the side portion of the backrest 14 that is the side portion of the seat 10, of the airbag 30. While the support inflation portion 52 is being inflated, accordingly, the lower end portion of the support inflation portion 52 easily comes in a narrow space between the side portion of the seat 10 and the side wall inside the vehicle, and then, can be inflated and deployed quickly and reliably.

The support inflation portion 52 is inflated and deployed in a predetermined shape, so that the support inflation portion 52 supports the back (for example, the backbone) of the torso of the occupant P sitting in the vehicle seat 10 and protects the back. The support inflation portion 52 is inflated and deployed in a conical shape in which the support inflation portion 52 broadens from its lower end portion toward its upper end portion, and accordingly, the protection inflation portion 54 is supported at a position corresponding to the shoulder of the occupant P above the support inflation portion 52.

As the first chamber 50 is inflated and deployed, the second chamber 60 located below the first chamber 50 is also deployed between the side wall inside the vehicle and the occupant P. At this time, when the support inflation portion 52 is inflated and its thickness in the vehicle width direction increases, a gas flows into the second chamber 60 through the gas distribution holes 42*h* of the partition 40. The gas flow rate at this time, however, is smaller than the rate of the gas flowing into the upper end portion of the support inflation portion 52 and the protection inflation portion 54. Before the second chamber 60 is inflated widely in a desired shape, accordingly, the second chamber 60 can be deployed by the inflation and deployment of the first chamber 50 (see FIGS. 7 and 8).

In this manner, the second chamber 60 can be deployed between the side wall inside the vehicle and the occupant P before reaching a desired inflated state, and thus, the second chamber 60 is disposed in a normal deployment area irrespective of the intended size of an chamber. Then, the partition 40 deploys in a belt shape as the first chamber 50 reaches a desired inflated and deployed state, thereby increasing the amount of the gas flowing into the second chamber 60 through the gas distribution holes 42*h* of the partition 40. The second chamber can accordingly reach the desired inflated and deployed state.

As described above, the protection inflation portion 54 is inflated and deployed while being supported by the support inflation portion 52 at the position corresponding to the shoulder of the occupant above the support inflation portion 52. The protection inflation portion 54 accordingly protects the shoulder of the occupant P sitting in the vehicle seat 10. In this case, the support inflation portion 52 is deployed in such a shape that the support inflation portion 52 gradually becomes larger upwardly, that is, in a conical shape or pyramid shape, and thus can support the protection inflation portion 54 at a constant position as stably as possible.

The second chamber 60 is deployed so as to be positioned at the side of the occupant P as a result of the inflation and deployment of the first chamber 50, and then, is inflated below the first chamber 50, that is, at the position corresponding to one side of the front torso of the occupant P. Consequently, the second chamber 60 protects the front torso of the occupant P sitting in the vehicle seat 10.

The shape in which the airbag 30 is deployed in this case is regulated to a predetermined shape in accordance with the shape of the bag 32 itself, and is also regulated by the partition 40 to a flat shape that forms the first chamber 50 and the second chamber 60.

After the airbag 30 is deployed forward and upward in a flat shape from the side portion of the backrest 14, the gas flowing into the second chamber 60 flows to the outside through the vent hole 34, thereby restricting the airbag 30 from becoming too firm.

In the side airbag device 20 configured as described above, the gas supplied from the inflator 22 is introduced into the support inflation portion 52. The support inflation portion 52 is formed in such a shape that it gradually broadens from its lower end portion toward its upper end portion, and thus, the gas from the inflator 22 passes the support inflation portion 52 to flow into the protection inflation portion 54, thereby deploying the protection inflation portion 54 at once toward the side of the upper portion of the occupant P. The space between the side portion of the seat 10 and the side wall inside the vehicle usually widens as it goes upward, and thus, the first chamber 50 can be inflated and deployed quickly.

As the first chamber 50 is inflated and deployed, the second chamber 60 is deployed between the side wall inside the vehicle and the occupant P below the first chamber 50.

Although at this time, the gas flows into the second chamber 60 from the first chamber 50 through the gas distribution holes 42*h* of the partition 40, the flow rate of the gas is smaller than the rate of the gas flowing into the upper end portion of the support inflation portion 52 and the protection inflation portion 54. The second chamber 60 can accordingly be deployed between the side wall inside the vehicle and the occupant P before being inflated in a desired shape. Therefore, irrespective of its size, the second chamber 60 easily comes in between the side wall inside the vehicle and the occupant P to be disposed in a normal deployment area, and then, can be inflated in a desired shape.

In this manner, the entire airbag 30 can be deployed in a normal area quickly and accurately and, after being deployed, can also be inflated in a desired shape.

The lower end portion of the support inflation portion 52 is provided on the lower edge of the portion, which is disposed to overlap the side portion of the backrest 14 that is the side portion of the seat 10, of the airbag 30. This allows the support inflation portion 52 to easily come in a narrow space between the side portion of the seat 10 and the side wall inside the vehicle while the support inflation portion 52 is being inflated, thereby allowing the lower portion of the second chamber 60 to be disposed in a desired deployment area more quickly and more reliably.

Of the support inflation portion 52, the side portion between the portion of the partition 40 and the portion opposing the portion of the partition 40 is provided to be abuttable against the side portion of the backrest 14 that is the side portion of the seat 10. While the support inflation portion 52 is being inflated, accordingly, the support inflation portion 52 is inflated while abutting against the side portion of the seat 10. This allows the first chamber 50 to be inflated and deployed more reliably along the side portion of the seat 10, thereby more reliably regulating the direction in which the first chamber 50 is deployed.

Providing the belt-shaped partition 40 as a separator can provide a thickness to the airbag 30 in the vehicle width direction at the separator between the first chamber 50 and the second chamber 60. A function for protecting an occupant can also be provided to a portion of the airbag 30 adjacent to the separator, thereby facilitating the adjustment according to the shape of the seat 10 and the part of the occupant P to be protected. The airbag 30 is resistant to folding at the partition 40, and accordingly, also, the flat deployment shape of the airbag 30 can be maintained stably. Needless to say, the belt-shaped partition 40 is not always required to be provided as a separator. For example, a separator may be provided by joining the facing portions of a bag through sewing or the like. In this case, a portion that is not sewn can be partially provided in the facing portions of the bag to serve as a gas distribution hole.

Providing the vent hole 34 in the second chamber 60 provides an internal pressure difference between the first chamber 50 and the second chamber 60, thereby facilitating the adjustment of the firmness (reaction force) of the airbag in accordance with the part of the occupant P to be protected.

The inflator 22 is provided in the support inflation portion 52 with its extension direction aligned with the direction in which one end and the other end of the support inflation portion 52 are linked. Thus, the inflator 22 can first inflate the support inflation portion 52 more reliably.

The partition 40 as a separator includes the first separator (the portion disposed along the line 45$a$) and the second separator (the portion disposed along the line 45$b$). The first separator is provided while being inclined to the direction in which the inflator 22 extends at a position distanced from the side of the inflator 22 and separates the support inflation portion 52 and the second chamber 60 from each other. The second separator is consecutively provided at the other end portion of the first separator and is provided while being inclined more than the first separator to the direction in which the inflator 22 extends and separates the protection inflation portion 54 and the second chamber 60 from each other. Thus, the first chamber 50 can be deployed in a shape including the support inflation portion 52 and the protection inflation portion 54 while the partition 40 is separating the first chamber 50 and the second chamber 60.

The bag 32 is not always required to be separated by the partition 40, and the facing portions of a bag may be sewn, for example, directly sewn.

The protection inflation portion 54 is configured to be deployable with a size and a thickness greater than those of the other end portion of the support inflation portion 52, and thus, the protection inflation portion 54 can effectively protect the occupant P (herein, the shoulder).

At least one of the gas distribution holes 42$h$ is provided on the extension of the direction in which a gas is ejected from the inflator 22. Thus, the gas ejected from the inflator 22 is blown directly toward the gas distribution hole 42$h$, so that the gas passes through the gas distribution hole 42$h$ to flow into the second chamber 60. The entire airbag 30 can thus be deployed more reliably.

Figure 8:
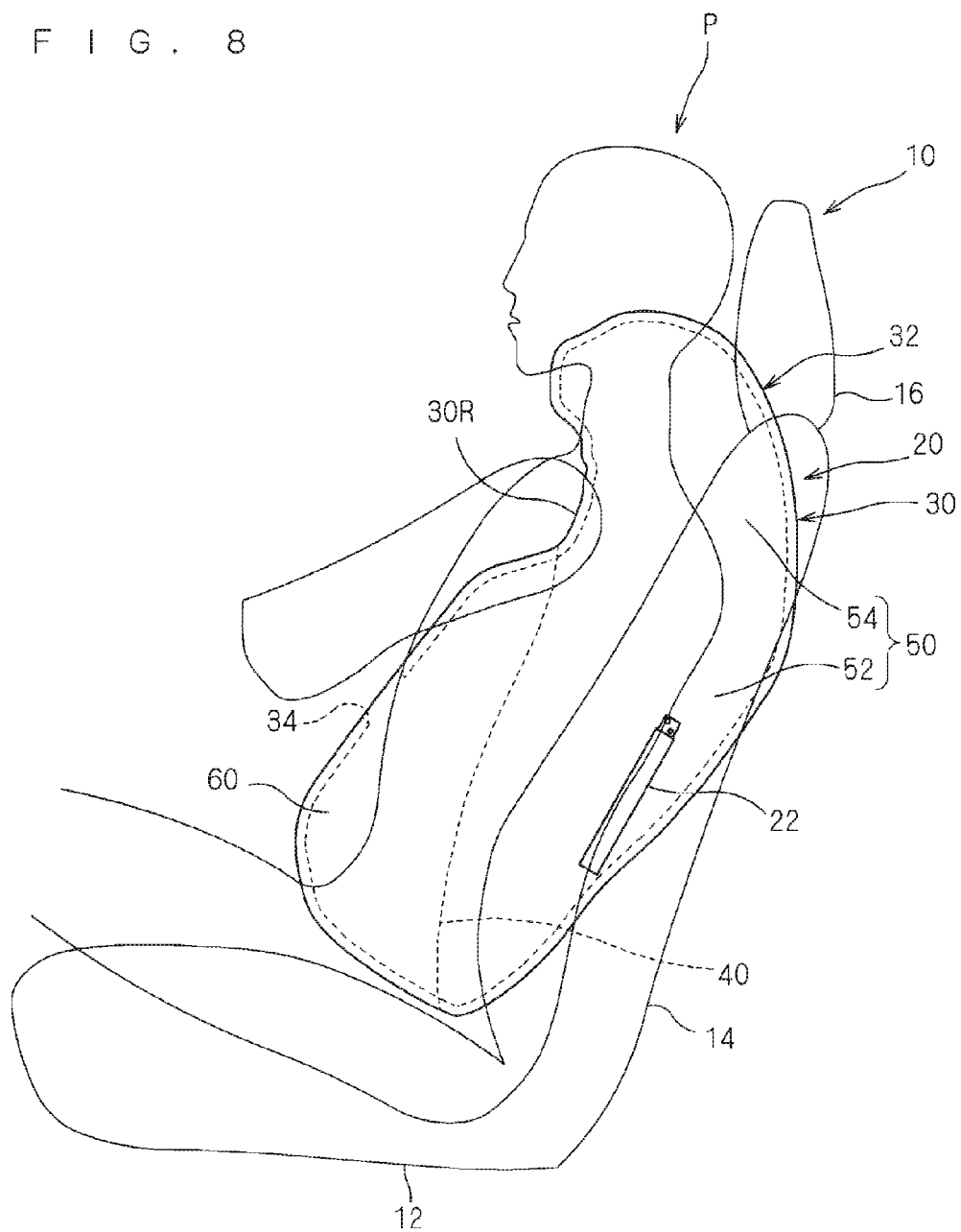
FIG. 8 is a view for explaining the positional relationship a deployed airbag and an occupant.

As shown in FIG. 8, this embodiment also discloses a side airbag device 20 that includes the first chamber 50 including the portion (herein, the support inflation portion 52) that receives the back of the torso of the occupant P and the second chamber 60 including the portion that receives the front part of the occupant P. The side airbag device 220 is configured such that the first chamber 50 has a pressure higher than that of the second chamber 60 in the airbag 30 inflated and deployed state.

The configuration for setting the pressure in the first chamber 50 to be greater than the pressure in the second chamber 60 is achieved by at least one of the following: supplying a gas from the inflator 22 to the first chamber 50 and then causing the gas to flow into the second chamber 60 (providing a time difference for inflation between the first chamber 50 and the second chamber 60); and providing a configuration in which a gas is exhausted more easily from the second chamber 60 than from the first chamber 50 (providing the vent hole 34 in the second chamber 60).

Then, the rear-side first chamber 50 is set to a relatively high pressure, and the front-side second chamber 60 is set to a relatively low pressure, leading to an operational advantage that the occupant P can be received and protected in a manner suitable for each part of the occupant P.

In other words, at the initial stage of deployment, the support inflation portion 52 is to deploy the protection inflation portion 54 and, at the same time, is located between the occupant P and the vehicle. The support inflation portion 52 which is a high-pressure chamber filled with the gas from the inflator 22 contacts the rear part (the back) of the occupant P, thereby serving to restrict the occupant P from moving relative to the side portion of the vehicle. Then, the gas flows into the protection inflation portion 54 and the second chamber 60, and the protection inflation portion 54 and the second chamber 60 are deployed. After that, the first chamber 50 (in particular, the support inflation portion 52) with a relatively high pressure protects the rear part (the back) of the occupant P, which is relatively resistant to damage in the torso, and the second chamber 60 with a relatively low pressure can softly receive and protect the front part (the abdomen and chest) of the occupant P, which is susceptible to damage in the torso. In this manner, the front part (the abdomen and chest) of the occupant P can be softly received by the second chamber 60 with a relatively low pressure while the rear part (the back) of the occupant P is being received by the first chamber 50 with a relatively high pressure, so that the occupant P can be received and protected in a manner suitable for each part of the occupant P.

The partition 40 as a separator is disposed to obliquely cut across the occupant P upward from the back to the front, and the upper portion of the support inflation portion 52 and the protection inflation portion 54 are disposed at, for example, the shoulder of the occupant P. The shoulder of the occupant P relatively susceptible to damage can be firmly received and protected by the first chamber 50 with a relatively high pressure. Also from this respect, the occupant P can be firmly received and protected in a manner suitable for each part (the shoulder) of the occupant P.

The portion (second separator) of the partition 40 of the airbag 30, which is disposed along the line 45b, reaches the front edge portion of the airbag 30 and, when the inflated and deployed airbag 30 is seen from the side of the vehicle, a recess 30R is formed in the portion in which the partition 40 reaches the front edge portion of the airbag 30 (see FIG. 8). For this reason, for example, when the shoulder of the occupant P is positioned in the deployment space of the airbag 30, the recess 30R interferes with the shoulder of the occupant P from the rear of the vehicle while the airbag 30 is being inflated and deployed. This restricts the portion between the support inflation portion 52 and the protection inflation portion 54 from moving toward the front of the vehicle, so that the support inflation portion 52 is kept along the side portion of the occupant P. This more reliably maintains the state in which the front portion (the abdomen) of the occupant P can be softly received by the second chamber 60 with a relatively low pressure while the rear portion (the back) of the occupant P is being received by the first chamber 50 with a relatively high pressure. The partition 40 is preferably positioned at a boundary between the back and the chest and abdomen.

The operational effect above can be achieved when the partition 40 has a width constant along its extension direction as well as when the partition 40 has a width varying along its extension direction.

MODIFICATIONS

Figure 10:
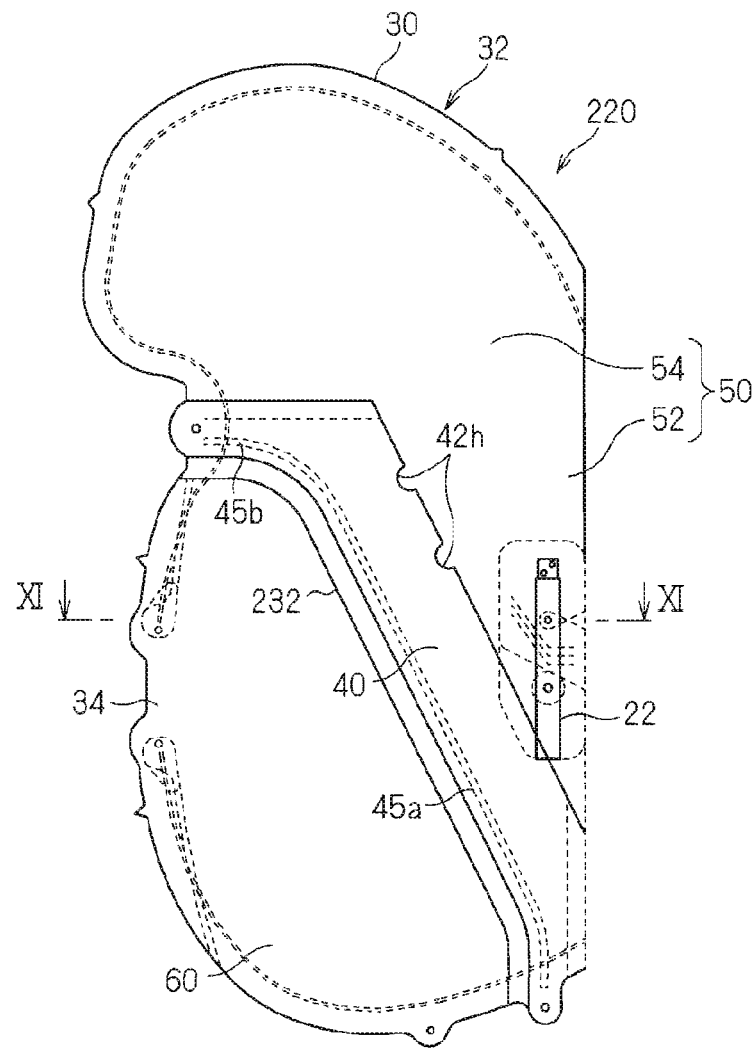
FIG. 10 is a schematic side view of a side airbag device according to a second modification.
Figure 11:
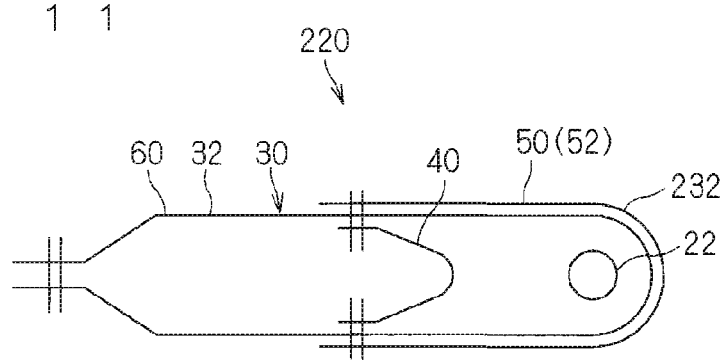
FIG. 11 is a schematic cross-sectional view taken along the line XI-XI of FIG. 10.

FIG. 10 is a schematic side view of a side airbag device 220 according to a second modification. FIG. 11 is a schematic cross-sectional view taken along the line XI-XI of FIG. 10. The modifications will mainly describe differences from the side airbag device 20 according to the embodiment, and the portions having similar configurations will be described by being denoted by the same references.

In the side airbag device 220, a portion, which forms the first chamber 50, of the bag 32 has a multilayer structure. More specifically, another base fabric overlaps the portion of the base fabric forming the bag 32, which forms the first chamber 50. Another base fabric may overlap the outer or inner of the base fabric forming the bag 32. Another base fabric may include one or a plurality of base fabrics. Herein, another base fabric overlaps the outer of the base fabric forming the bag 32.

The configuration in which another base fabric is kept overlapping one base fabric may be achieved, for example, by sewing or with an adhesive. Herein, another base fabric is joined to the bag 32 along the sewing line for sewing the peripheral edge portion of the bag 32 and the sewing line for sewing the partition 40 to the bag 32. As a result, another fabric can be easily kept in an overlapping manner.

This modification effectively reduces, for example, a rupture of the joint portion 33 and damage to the base fabric in the first chamber 50 while the airbag 30 is being inflated and deployed. In other words, since in the airbag 30, the pressure in the first chamber 50 is higher than the pressure in the second chamber 60, a large force is easily exerted on the joint portion 33 and the base fabric which form the first chamber. By providing a multilayer structure to the portion, which forms the first chamber 50, of the bag 32, for example, a rupture of the joint portion 33 and damage to the base fabric can be effectively reduced in the first chamber 50.

The pressure in the second chamber 60 does not become as high as the pressure in the first chamber 50, and thus, a use amount of base fabric can be reduced by structuring the portion, which forms the second chamber 60, of the bag 32 so as to have few layers compared with the portion of the first chamber 50.

Figure 12:
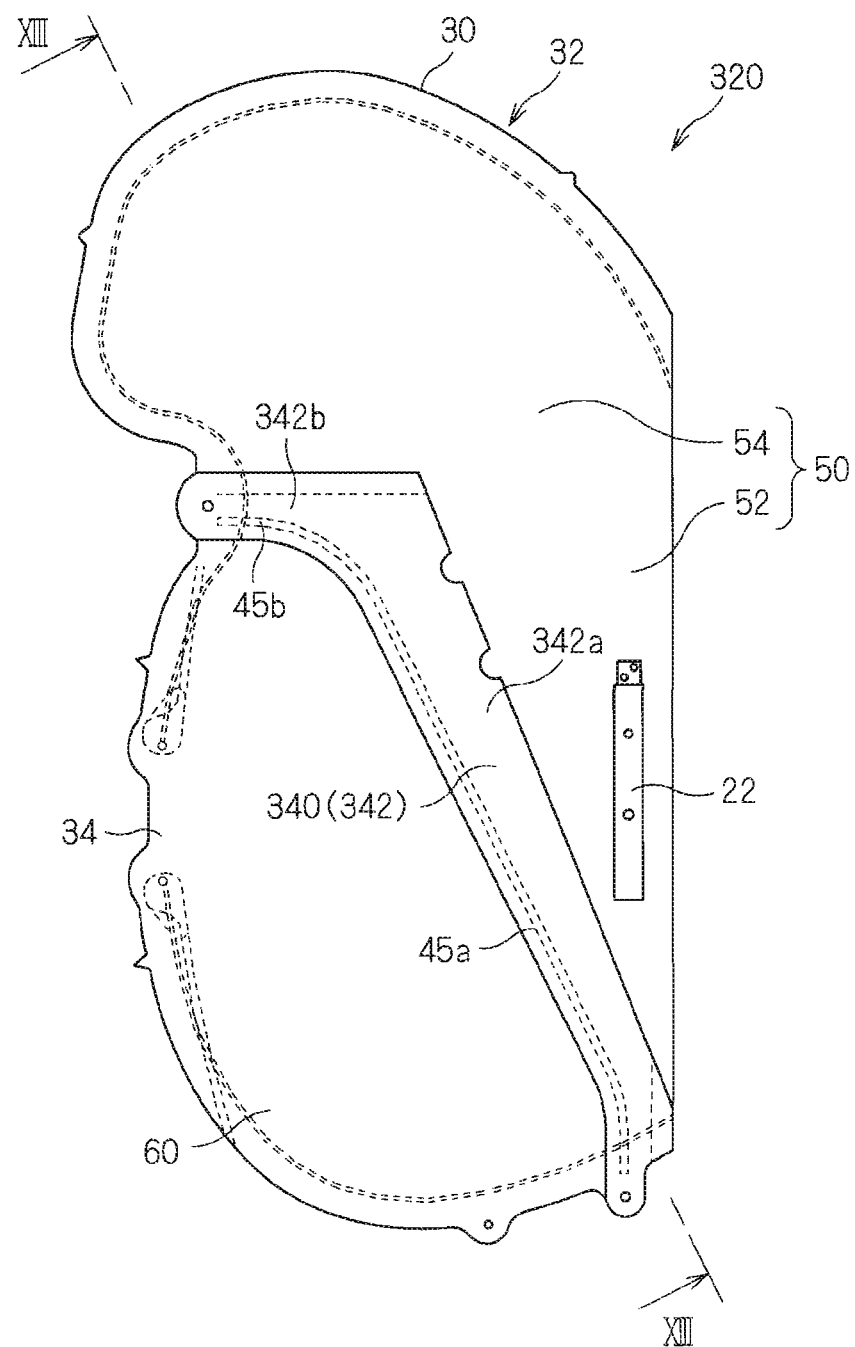
FIG. 12 is a schematic side view of a side airbag device according to a third modification.

FIG. 12 is a schematic side view of a side airbag device 320 according to a third modification. FIG. 13 is a schematic cross-sectional view taken along the line XIII-XIII of FIG. 12. FIG. 14 shows the shape of a partition fabric 342 for forming a partition 340.

The side airbag device 320 employs the partition 340 described below in place of the partition 40.

The partition 340 is fat med with a width varying along its extension direction.

More specifically, the partition 340 is formed in a belt shape. The partition fabric 342 for forming the partition 40 includes a first portion 342a and a second portion 342b. The first portion 342a is disposed along the line 45a for separating the support inflation portion 52 of the first chamber 50 and the second chamber 60 from each other. The second portion 342b is disposed along the line 45b for separating the protection inflation portion 54 of the first chamber 50 and the second chamber 60 from each other.

The entire portion of the first portion 342a except for an end portion 343 is formed in such a shape that the first portion 342a gradually narrows toward its end portion. The end portion 343 of the first portion 342a is formed in such a shape that the end portion 343 spreads in a V shape as in the end portion 43 in the embodiment above. The second portion 342b is also formed in such a shape that it spreads in a V shape. The spread angle of the end portion 343 of the first portion 342a is smaller than the spread angle of the second portion 342b.

With the partition fabric 342 folded in half along the line at the center in its width direction, the inner edge portions in the V shape portion of the end portion 343 of the first portion 342a are joined by sewing or the like, and the inner edge portions in the V shape portion of the second portion 342b are joined by sewing or the like. Then, as in the embodiment above, the end portion 343 and the other end portion 344 of the first portion 342a are inclined to an intermediate portion 342M of the partition fabric 342 (the portion of the first portion 342a except for the end portion 343) at the side at which the partition fabric 342 is folded.

In this state, the first portion 342a has such a shape that it gradually narrows from the second portion 342b toward the end portion 343, and the second portion 342b has such a shape that it gradually narrows toward its end portion. In particular, this modification differs from the embodiment above in that the entire portion of the first portion 342a except for the end portion 343 gradually narrows toward the end portion 343.

The first portion 342a is joined to the bag 32 along the line 45a in the bag 32, and also, the second portion 342b is joined to the bag 32 along the line 45b in the bag 32.

The partition 340 defined by the partition fabric 342 accordingly separates the bag 32 into the first chamber 50 and the second chamber 60 as in the embodiment above.

In the side airbag device 320 configured as described above, the intermediate portion 342M of the partition 340 in its extension direction is formed with a width varying along its extension direction. With the airbag 330 deployed, accordingly, the thickness of the airbag 330 along the partition 340 can be adjusted. Herein, the intermediate portion 342M of the partition 340 in its extension direction, which separates the support inflation portion 52 of the first chamber 50 and the second chamber 60 from each other, is formed with a width gradually narrowing toward its end portion. Thus, the thickness of the support inflation portion 52 of the first chamber 50 can be easily adjusted to be smaller in its lower portion and greater in its upper portion. Therefore, the shape of the airbag 330 can be easily adjusted in accordance with, for example, preferred protection characteristics.

Figure 15:
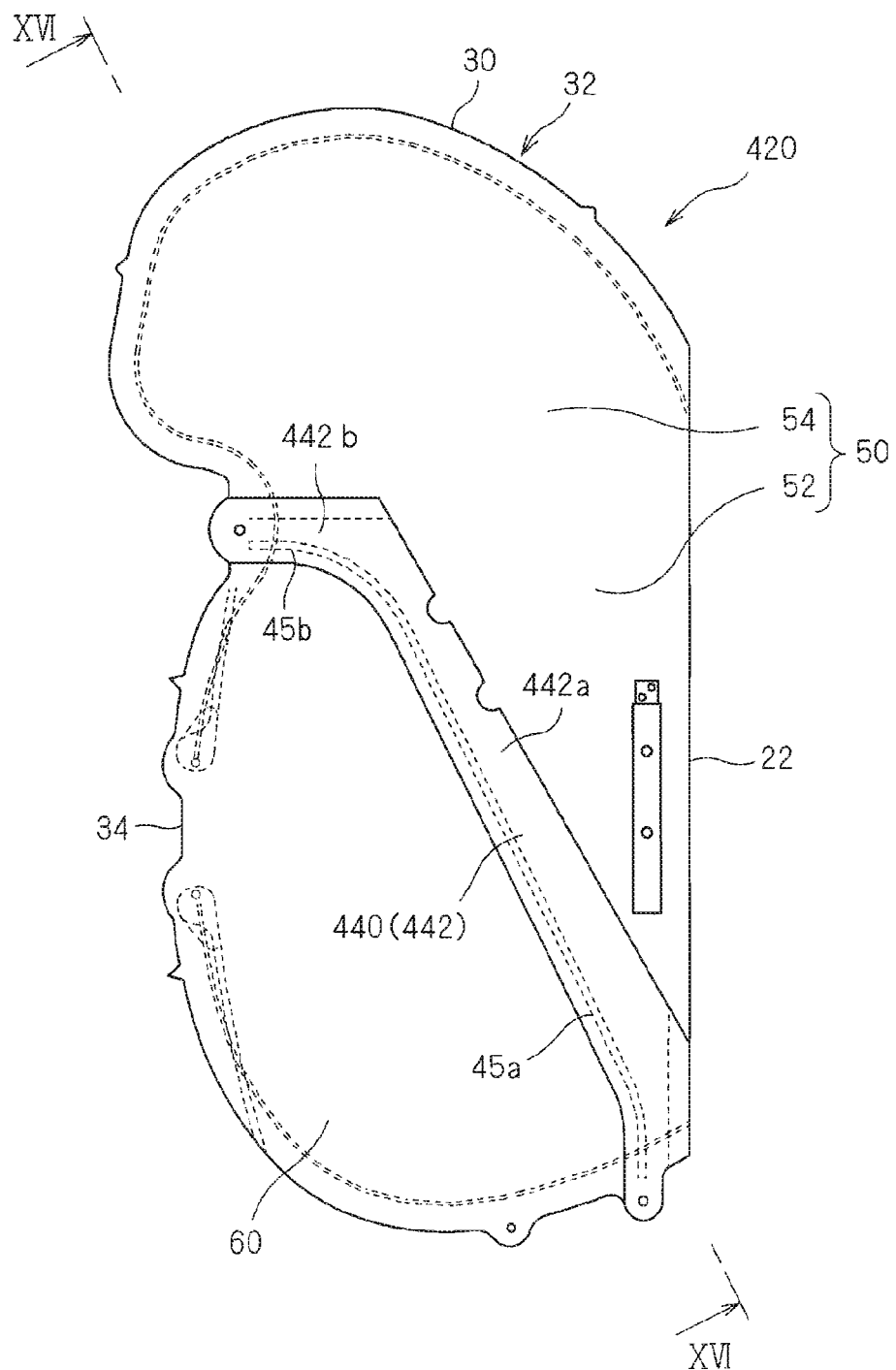
FIG. 15 is a schematic side view of a side airbag device according to a fourth modification.
Figure 16:
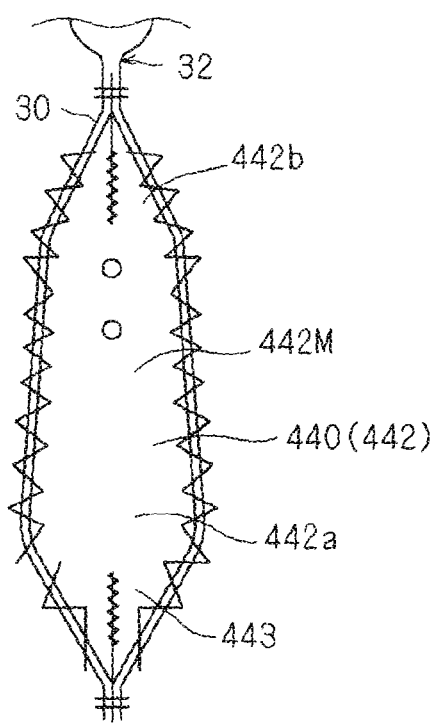
FIG. 16 is a schematic cross-sectional view taken along, the line XVI-XVI of FIG. 15.
Figure 17:
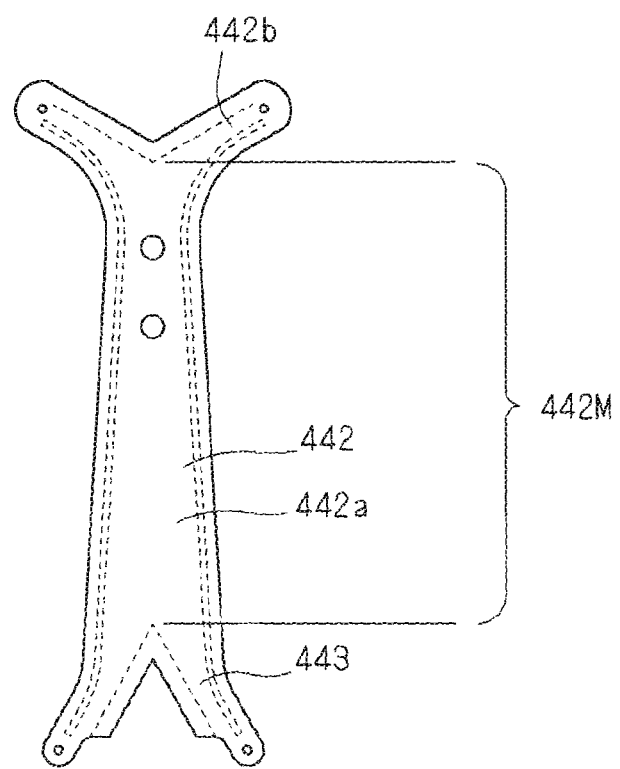
FIG. 17 shows the shape of a partition fabric for forming a partition.

FIG. 15 is a schematic side view of a side airbag device 420 according to a fourth modification. FIG. 16 is a schematic cross-sectional view taken along the line XVI-XVI of FIG. 15. FIG. 17 shows the shape of a partition fabric 442 for forming a partition 440.

The side airbag device 420 employs the partition 440 below in place of the partition 40.

The partition 440 is formed with a width varying along its extension direction.

More specifically, the partition 440 is formed in a belt shape. The partition fabric 442 for forming the partition 40 includes a first portion 442a and a second portion 442b. The first portion 442a is disposed along the line 45a for separating the support inflation portion 52 of the first chamber 50 and the second chamber 60 from each other. The second portion 442b is disposed along the line 45b for separating the protection inflation portion 54 of the first chamber 50 and the second chamber 60 from each other.

The entire portion of the first portion 442a except for an end portion 443 is formed in such a shape that the first portion 442a gradually widens toward its end portion. The end portion 443 of the first portion 442a is formed in such a shape that the end portion 443 spreads in a V shape as in the end portion 43 in the embodiment above. The second portion 442b is also formed in such a shape that it spreads in a V shape. The spread angle of the end portion 443 of the first portion 442a is smaller than the spread angle of the second portion 342b.

With the partition fabric 442 folded in half along the line at the center in its width direction, the inner edge portions in the V shape of the end portion 443 of the first portion 442a are joined by sewing or the like, and the inner edge portions of the portions in the V shape of the second portion 342b are joined by sewing or the like. Then, as in the embodiment above, the end portion 443 and the other end portion 444 of the first portion 442a are inclined to an intermediate portion 442M of the partition fabric 442 (the portion of the first portion 442a except for the end portion 443) at the side at which the partition fabric 442 is folded.

In this state, the first portion 442a has such a shape that it gradually widens from the second portion 442b toward the end portion 443. The second portion 442b has such a shape that it gradually narrows toward its end portion. In particular, this modification differs from the embodiment and the third modification above in that the portion of the first portion 442a except for the end portion 443 gradually widens toward the end portion 443.

The first portion 442a is joined to the bag 32 along the line 45a in the bag 32, and the second portion 442b is joined to the bag 32 along the line 45b in the bag 32.

The partition 440 defined by the partition fabric 442 accordingly separates the bag 32 into the first chamber 50 and the second chamber 60.

In the side airbag device 420 configured as described above, the intermediate portion 442M of the partition 440 in its extension direction is formed with a width varying in its extension direction. With the airbag 430 deployed, accordingly, the thickness of the airbag 430 along the partition 440 can be adjusted. Herein, the intermediate portion 442M of the partition 440, which separates the support inflation portion 52 of the first chamber 50 and the second chamber 60 from each other, is formed with a width gradually widening toward its end portion. Thus, compared with the embodiment above, the thickness of the support inflation portion 52 of the first chamber 50 can be easily adjusted to be great in its lower portion and smaller in its upper portion. In other words, in this modification, the shape in which the support inflation portion 52 is inflated and deployed can be made a cylindrical shape or a conical shape close to a cylindrical shape. Consequently, the support inflation portion 52 can firmly protect the back of the torso of the occupant P, in particular, the hip entirely vertically.

The width of the intermediate portion of the partition in the width direction may be changed in accordance with, for example, preferred protection characteristics. For example, a narrow portion may be provided in the longitudinal intermediate portion of the partition. In other words, as in the third and fourth modifications, by partially changing the width of the intermediate portion of the belt-shaped partition 40 in accordance with the shape of the side wall inside the vehicle, the shape of the seat 10, the shape of the pillar, or any other shape, or in accordance with the part of the occupant P to be protected, the airbag 30 can be efficiently inflated and deployed even in a narrow space between the occupant and the side wall inside the vehicle. Additionally, the thickness of the airbag 30 in the vehicle width direction can be easily set so as to efficiently protect an occupant.

The configurations described in the embodiment and the modifications can be appropriately combined with each other as long as they are consistent with each other.

While the invention has been shown and described in detail, the foregoing description is in all aspects illustrative and not restrictive. It is therefore understood that numerous modifications and variations can be devised without departing from the scope of the invention.

REFERENCE SIGNS LIST 10 vehicle seat
20, 220, 320, 420 side airbag device
22 inflator
30, 330 airbag
32 bag
32a turnover portion
34 vent hole
40, 340, 440 partition
42, 342, 442 partition fabric
42h, 142h gas distribution port
50 first chamber
52 support inflation portion
54 protection inflation portion
60 second chamber
Q gas ejection direction

The invention claimed is:

1. A side airbag device to be incorporated in a seat-side portion of a vehicle, said side airbag device comprising:
an inflator; and
an airbag including a bag that is inflatable and a separator that separates said bag into a first chamber and a second chamber, said separator extending above a top of said inflator,
wherein:
said first chamber includes a support inflation portion and a protection inflation portion, said support inflation portion being deployable in such a shape that said support inflation portion gradually broadens from its lower end portion toward its upper end portion along said seat-side portion, said protection inflation portion being deployable above said upper end portion of said support inflation portion,
said inflator is disposed so as to supply a gas into said support inflation portion,
said separator includes at least one gas distribution hole, and
said second chamber is located below said first chamber,
wherein a part of said support inflation portion is level with said inflator with respect to a direction in which the seat-side portion extends vertically.

2. The side airbag device according to claim 1, wherein said lower end portion of said support inflation portion is located at a lower edge of an overlapping portion of said airbag, said overlapping portion being disposed and deployable to overlap said seat-side portion.

3. The side airbag device according to claim 1, wherein a side portion of said support inflation portion between said separator and a rear portion of the bag opposing the portion of said separator is provided to be abuttable against said seat-side portion entirely in a direction in which said side portion extends.

4. The side airbag device according to claim 1, wherein said separator is a belt-shaped partition having both end portions joined to portions of said bag opposing the both end portions.

5. The side airbag device according to claim 4, wherein an intermediate portion of said partition in its extension direction is formed with a width varying along the extension direction.

6. The side airbag device according to claim 1, wherein said second chamber includes a gas exhaust port.

7. The side airbag device according to claim 1, wherein said support inflation portion is substantially cone-shaped.

8. The side airbag device according to claim 1 wherein said support inflation portion is substantially pyramid-shaped.

9. The side airbag device according to claim 1, wherein a flow rate of gas into the second chamber is smaller than a flow rate of gas into the upper end portion of the support inflation portion and the protection inflation portion.

10. A side airbag device to be incorporated in a seat-side portion of a vehicle, said side airbag device comprising:
an inflator; and
an airbag including a bag that is inflatable and a separator that separates said bag into a first chamber and a second chamber, said separator extending above a top of said inflator,
wherein:
said first chamber includes a support inflation portion and a protection inflation portion, said support inflation portion being deployable in such a shape that said support inflation portion gradually broadens from its lower end portion toward its upper end portion along said seat-side portion, said protection inflation portion being deployable above said upper end portion of said support inflation portion,
said inflator is disposed so as to supply a gas into said support inflation portion,
said separator includes at least one gas distribution hole, and
said second chamber is located below said first chamber,
wherein the lower end portion of said support inflation portion forms a pointed end portion in gas communication with said inflator.

11. The side airbag device according to claim 10, wherein said support inflation portion is substantially cone-shaped.

12. The side airbag device according to claim 10, wherein said support inflation portion is substantially pyramid-shaped.

13. The side airbag device according to claim 10, wherein a flow rate of gas into the second chamber is smaller than a flow rate of gas into the upper end portion of the support inflation portion and the protection inflation portion.

* * * * *